United States Patent
Lam

(10) Patent No.: US 9,865,044 B2
(45) Date of Patent: Jan. 9, 2018

(54) METHOD FOR LIGHT FLICKER ANALYSIS AND DEVICE THEREOF

(71) Applicant: Hong Kong Baptist University, Hong Kong (CN)

(72) Inventor: Ka Man Lam, Hong Kong (CN)

(73) Assignee: HONG KONG BAPTIST UNIVERSITY, Kowloon Tong, Kowloon (HK)

( * ) Notice: Subject to any disclaimer, the term of this patent is extended or adjusted under 35 U.S.C. 154(b) by 409 days.

(21) Appl. No.: 14/673,881

(22) Filed: Mar. 31, 2015

(65) Prior Publication Data

US 2015/0279023 A1    Oct. 1, 2015

Related U.S. Application Data

(60) Provisional application No. 61/972,429, filed on Mar. 31, 2014.

(51) Int. Cl.

| | |
|---|---|
| *G06T 7/00* | (2017.01) |
| *G06K 9/46* | (2006.01) |
| *H04N 5/235* | (2006.01) |
| *G06K 9/20* | (2006.01) |
| *G06K 9/40* | (2006.01) |
| *H04N 5/353* | (2011.01) |

(52) U.S. Cl.
CPC .......... *G06T 7/0004* (2013.01); *G06K 9/4661* (2013.01); *H04N 5/2357* (2013.01); *G06K 9/2027* (2013.01); *G06K 9/40* (2013.01); *G06T 2207/10016* (2013.01); *G06T 2207/30108* (2013.01); *H04N 5/3532* (2013.01)

(58) Field of Classification Search
CPC ........ G06T 7/0004; G06T 2207/30108; G06K 9/4661; G06K 9/2027; H04N 5/2357; H04N 5/3532
See application file for complete search history.

(56) References Cited

U.S. PATENT DOCUMENTS

| | | | |
|---|---|---|---|
| 2005/0276511 A1* | 12/2005 | Jeffrey | ...................... G06T 3/40 382/277 |
| 2009/0051782 A1* | 2/2009 | Ono | ...................... H04N 5/235 348/226.1 |

* cited by examiner

*Primary Examiner* — Huy T Nguyen

(74) *Attorney, Agent, or Firm* — Idea Intellectual Limited; Margaret A. Burke; Sam T. Yip

(57) ABSTRACT

This invention provides devices and methods of determining flicker-related parameters of a light emitting source. In one embodiment, the method has the following steps: a) acquiring one or more photo images or video images of a light emitting source with an image capturing device that has a rolling shutter; b) generating, with a processor, from the photo images or video images a flicker frame having one or more flicker dark lines, wherein each flicker dark lines has an output column value of 1; and c) generating, with a processor, one or more flicker-related parameters based on the flicker frame, thereby determining the flicker-related parameters of the light emitting source.

20 Claims, 10 Drawing Sheets

METHOD FOR LIGHT FLICKER ANALYSIS AND DEVICE THEREOF

This application claims the benefit of U.S. 61/972,429 filed Mar. 31, 2014. The entire disclosure of the preceding application is hereby incorporated by reference into this application.

FIELD OF THE INVENTION

The present invention relates generally to the field of image processing. In one embodiment, there is provided methods for measuring flicker-related parameters of a light emitting source using image capturing apparatus in mobile devices.

BACKGROUND OF THE INVENTION

To save energy, the global trend of lighting equipment is transitioning from traditional incandescent light bulbs to compact fluorescent lamps (CFLs) and Light Emitting Diode lamps (LEDs). To produce the same amount of light intensity, CFLs and LEDs can save 70% to 90% of energy than incandescent light bulbs. This is why governments around the world have passed regulations or measures to ban or stop the manufacture, importation or sale of incandescent light bulbs in order to phase out the old generation of lighting equipment and switch to a more energy-effective generation like CFLs and LEDs. However, most CFLs contain mercury, which is toxic and harmful to health and also harmful to the environment if it is not disposed properly. LEDs do not contain mercury but raise other health concern.

According to the paper "LED Lighting Flicker and Potential Health Concerns: IEEE Standard PAR1789 Update", LED lighting produces flicker which is a rapid and repeated change over time in the brightness of light. Immediate result of a few seconds' exposure to visible flicker (low flicker frequency) can trigger epileptic seizures (even to individuals with no previous history or diagnosis of epilepsy) while long-term exposure to invisible flicker (high flicker frequency) would cause adverse health effects like malaise, headaches and impaired visual performance. As LED bulbs with different levels of flicker will cause different harmful effects to people, the flicker properties of LED would be a consumer's selection criteria other than the price.

In the literature, flicker percentage, flicker index and flicker frequency are the metrics used to describe how severe the flicker is. However, such information is often not available on the light bulb package while measuring these values needs professional equipment in the laboratory. Nevertheless, general consumers actually do not need to know the exact values of the flicker properties. In fact, consumers would be able to make a choice if they know Light Bulb A is at flicker level 1 which is the safest level to health while Light Bulb E is at flicker level 5 which will lead to serious harmful health effects, or if they know both Light Bulb B and Light Bulb C are at flicker level 3 but Light Bulb B is having less flickering than Light Bulb C. It is one objective of the present invention that consumers will be able to use their handy mobile phones to take videos of light bulbs and obtain such comparisons.

Due to the changing trend of lighting equipment, the health concern over the flicker problem and the lack of available information of flicker percentage, flicker index and flicker frequencies, there is a need for such a handy mobile application for consumer to check the bulbs before they make a purchase. There is a need to better inform the consumer. If consumers can make a better choice, they can avoid potential harmful effects to their health like epileptic seizures, malaise, headaches, impaired visual performance, etc., which in turn would improve students' learning quality and improve people's productivity. Hence, not only the health of the public but also the economy and the society would be benefited.

In industrial settings, when companies attend lighting equipment expo to look for new products or when companies receive products from the manufacturers, they always want to check whether the products are meeting the standard or acceptable. In these situations, the industry would require a mobile solution as a kind of handy preliminary quality screening. It is thus another objective of the present invention to provide such a mobile solution as a kind of handy preliminary quality screening of flickering light products.

Citation or identification of any reference in this section or any other section of this application shall not be construed as an admission that such reference is available as prior art for the present application.

SUMMARY OF THE INVENTION

Accordingly, it is an object of the present invention to provide a method of measuring the flickers of light emitting sources using image capturing apparatus in mobile devices. In one embodiment, the present invention relates to a method of measuring the flickers of light emitting sources using image capturing apparatus in mobile devices for quality checking and quality control of said light emitting sources. In one embodiment of the present invention, there is provided methodologies and algorithms to estimate metrics like the percent flicker, the order of flicker index and the order of flicker frequency through analysing photos and/or videos of a light emitting source.

In one embodiment of the present invention, there is provided a method and an apparatus for measuring the flickers of light emitting sources comprising the use of at least one image capturing apparatus in mobile devices. There is provided methodologies and algorithms in said mobile devices to analyze the flickers in one or more captured photos and in one or more captured videos, wherein further said methodologies and algorithms estimate metrics comprising the percent flicker, the order of flicker index and the order of flicker frequency of said light emitting sources.

In one embodiment of the present invention, there is provided a method of using mobile devices such as smartphones, tablets, laptops, notebooks and computer devices with at least one image capturing apparatus.

In one embodiment of the present invention, there is provided a method of using at least one image capturing apparatus comprising at least one still photography camera and at least one video camera, or at least one camera that can capture both still photography and video.

In one embodiment of the present invention, there is provided a method and an apparatus wherein said methodologies and algorithms comprise modules of Noise Filter, Flicker Identifier, Flicker Analyzer and Database.

In one embodiment, there is provided a method and an apparatus wherein after capturing one or more video, said one or more video is passed to the Noise Filter to eliminate motion noise and background noise and to produce a Flicker Frame, wherein further the Flicker Analyzer will analyze the flickers from the Flicker Frame and compute metrics estimations such as percent flicker, order of flicker index and order of flicker frequency, wherein such metrics estimations are recorded in a Database for reference or comparison.

In another embodiment, there is provided a method and an apparatus wherein after capturing one or more photo the Flicker Identifier will compute a Flicker Frame from said one or more photo, the Flicker Frame will then be passed to the Flicker Analyzer, wherein further the Flicker Analyzer will analyze the flickers from the Flicker Frame and compute metrics estimations such as percent flicker, order of flicker index and order of flicker frequency, wherein such metrics estimations are recorded in the Database for reference or comparison.

In another embodiment, there is provided a method and an apparatus wherein said method is implemented in hardware.

In yet another embodiment, there is provided a method and an apparatus wherein said method is implemented in software.

Those skilled in the art will appreciate that the invention described herein is susceptible to variations and modifications other than those specifically described.

The present invention includes all such variation and modifications. The invention also includes all of the steps and features referred to or indicated in the specification, individually or collectively, and any and all combinations or any two or more of the steps or features.

In one embodiment, this invention provides a method of determining flicker-related parameters of a light emitting source, comprising the steps of: a) acquiring one or more photo images or video images of a light emitting source with an image capturing device that comprises rolling shutter; b) generating, with a processor, from said photo images or video images a flicker frame comprising one or more flicker dark lines, wherein each flicker dark lines has an output column value of 1; and c) generating, with a processor, one or more flicker-related parameters based on said flicker frame, thereby determining the flicker-related parameters of said light emitting source.

In one embodiment, said flicker-related parameters are selected from the group consisting of percent flicker, order of flicker frequency, and order of flicker index.

In one embodiment, said flicker frame is produced from said video images by the steps comprising: a) determining the sum of the differences in pixel values between corresponding pixels in successive frames of the video image, wherein any two successive frames, a first frame and a second frame, that have the smallest difference are the frames that have the least motion noise; b) subtracting the pixel value of each pixel on said first frame from the pixel value of the corresponding pixel on said second frame to obtain changes in pixel values over time; c) assigning a column output value of "1" to each column of pixels in said video image wherein in each of said column, the number of pixels having decreased pixel value over time is more than the sum of the number of pixels having increased pixel value over time; d) assigning a column output value of "0" to each columns of pixels in said video image wherein in each of said column, the number of pixels having decreased pixel value over time is not more than the sum of the number of pixels having increased pixel value over time and the number of pixels having no change in pixel value over time; and e) assembling a flicker frame by drawing each of said column of pixels where its column output value is "1" in the order each corresponding column of pixels is acquired in the video image.

In one embodiment, said flicker frame is produced from said photo image with the steps comprising: a) obtaining a brightness value for each pixel in said photo image; b) quantizing said brightness value of each pixel in said photo image; c) assigning a dark level value of "1" to the pixels on each row of the image that are bounded by a first pixel and a second pixel, wherein the quantized value of said first pixel is smaller than its preceding pixel in the same row and the quantized value of said second pixel is smaller than its succeeding pixel in the same row, and further wherein the quantized value of said first and second pixels are greater than the minimum of quantized value for all pixels in said photo image; d) assigning a white level value of "1" to the pixels on each row of the image that are bounded by a first pixel and a second pixel, wherein the quantized value of said first pixel is larger than its preceding pixel in the same row and the quantized value of said second pixel is larger than its succeeding pixel in the same row, and further wherein the quantized value of said first and second pixels are less than the maximum of quantized value for all pixels in said photo image; e) assigning a column output value of "1" to each column of pixels in said photo image wherein each of said column has more pixels assigned with dark level value "1" than pixels assigned with white level value "1"; f) assigning a column output value of "0" to each column of pixels in said photo image wherein each of said column has less or same number of pixels assigned with dark level value "1" compared to pixels assigned with white level value "1"; and g) assembling a flicker frame by drawing each of said column of pixels where its column output value is "1" in the order each corresponding column of pixels is acquired in the photo image. In another embodiment, said brightness value is obtained by the formula: Brightness, $B_{x,y}=0.299r+0.587g+0.114b$ wherein r, g and b are the red, green and blue value of the pixel respectively. In a further embodiment, said quantized value $Q(B_{x,y})$ is obtained by the formula:

$$Q(B_{x,y}) = \frac{B_{x,y}}{(255/q)}$$

wherein q is a quantization parameter.

In one embodiment, a value for percent flicker is calculated by the steps comprising: a) determining a minimum brightness value from all pixels that have (i) a dark level value of "1" and (ii) a quantized value greater than the minimum of the quantized value for all pixels in said photo image; b) determining a maximum brightness value from all pixels that have (i) a white level value of "1" and (ii) a quantized value less than the maximum of the quantized value for all pixels in said photo image; and c) calculating the percent flicker as:

$$\frac{\text{maximum brightness} - \text{minimum brightness}}{\text{maximum brightness} + \text{minimum brightness}}.$$

In one embodiment, said order of flicker frequency is calculated by the steps comprising: a) determining a thickness value of each flicker dark line in said flicker frame by summing the number of columns between a starting column and an ending column, wherein all columns between said starting column and said ending column inclusively have column output value of 1; and b) computing an order of flicker frequency by summing up the number of flicker dark lines above a threshold value, wherein said threshold value is T×maximum thickness of all flicker dark lines, and T is a threshold parameter between 0 and 1.

In one embodiment, said order of flicker index is calculated by the steps comprising: a) determining a thickness value of each flicker dark line in said flicker frame by summing the number of columns between a starting column and an ending column, wherein all columns between said starting column and said ending column inclusively have column output value of 1; b) computing an average thickness from all said thickness values that are above a threshold, wherein said threshold is T×maximum thickness of all flicker dark lines, and T is a threshold parameter between 0 and 1; and c) computing an order of flicker index by normalizing said average thickness with the width of the flicker frame.

In one embodiment, said image capturing device is a mobile device selected from the group consisting of a smart phone, a laptop computer, a tablet computer, and a digital camera.

In one embodiment, said light emitting source is an incandescent light bulb, a compact fluorescent lamps, or a Light Emitting Diode lamps (LEDs).

In one embodiment, said method further comprises the step of storing said flicker-related parameters with the corresponding image or video in a database. In another embodiment, said method further comprises the step of comparing and ranking said flicker-related parameters.

In one embodiment, this invention provides a device for determining flicker-related parameters of a light emitting source, comprising: a) an image capturing device that comprises rolling shutter for acquiring an image or video of said light emitting source; b) one or more processors for generating from a captured image (i) a flicker frame comprising one or more flicker dark lines, and (ii) one or more flicker-related parameters from said flicker frame; and c) a memory for storing said image or video and said flicker-related parameters.

In one embodiment, said device further comprises one or more processors for refining said flicker frame by processing a video image.

In one embodiment, said flicker-related parameter is selected from the group consisting of percent flicker, order of flicker frequency, and order of flicker index.

In one embodiment, said flicker dark lines are determined by said one or more processors upon executing the steps comprising: a) obtaining a brightness value for each pixel in said captured image; b) obtaining a quantized value for each of said brightness value; c) assigning a dark level value of "1" to pixels on each row of the image that are bounded by a first pixel and a second pixel, wherein the quantized value of said first pixel is smaller than its preceding pixel in the same row and the quantized value of said second pixel is smaller than its succeeding pixel in the same row and further wherein the quantized value of said first and second pixels are greater than the minimum of the quantized value for all pixels in said captured image; d) assigning a white level value of "1" to pixels on each row of the image that are bounded by a first pixel and a second pixel, wherein the quantized value of said first pixel is larger than its preceding pixel in the same row and the quantized value of said second pixel is larger than its succeeding pixel in the same row and further wherein the quantized value of said first and second pixels are less than the maximum of quantized value for all pixels in said captured image; e) assigning a column output value of "1" to each column of pixels in said photo image wherein each of said column has more pixels assigned with dark level value "1" than pixels assigned with white level value "1"; f) assigning a column output value of "0" to each column of pixels in said captured image wherein each of said column has less or same number of pixels assigned with dark level value "1" compared to pixels assigned with white level value "1"; and g) assembling a flicker frame by drawing each of said column of pixels where its column output value is "1" in the order each corresponding column of pixels is acquired in the captured image.

In one embodiment, said image capturing device is a smart phone, laptop computer, tablet computer, or a digital camera.

In one embodiment, this invention provides a non-transitory computer-readable medium with instructions stored thereon, that when executed by a processor, perform the steps comprising: a) obtaining a brightness value for each pixel in a captured image; b) obtaining a quantized value for each of said brightness value; c) assigning a dark level value of "1" to pixels on each row of the image that are bounded by a first pixel and a second pixel, wherein the quantized value of said first pixel is smaller than its preceding pixel in the same row and the quantized value of said second pixel is smaller than its succeeding pixel in the same row and further wherein the quantized value of said first and second pixels are greater than the minimum of the quantized value for all pixels in said captured image; d) assigning a white level value of "1" to pixels on each row of the image that are bounded by a first pixel and a second pixel, wherein the quantized value of said first pixel is larger than its preceding pixel in the same row and the quantized value of said second pixel is larger than its succeeding pixel in the same row and further wherein the quantized value of said first and second pixels are less than the maximum of the quantized value for all pixels in said captured image; e) assigning a column output value of "1" to each column of pixels in said photo image wherein each of said column has more pixels assigned with dark level value "1" than pixels assigned with white level value "1"; f) assigning a column output value of "0" to each column of pixels where each such column has less or same number of pixels assigned with dark level value "1" compared to pixels assigned with white level value "1"; and g) assembling a flicker frame by drawing each column of pixels where its column output value is "1" in the order each corresponding column of pixels is acquired in the captured image.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; i.e. they allow for elements not explicitly recited.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Throughout this application, various references or publications are cited. Disclosures of these references or publications in their entireties are hereby incorporated by reference into this application in order to more fully describe the state of the art to which this invention pertains.

Other aspects and advantages of the invention will be apparent to those skilled in the art from a review of the ensuing description.

BRIEF DESCRIPTION OF THE DRAWINGS

The above and other objects and features of the present invention will become apparent from the following description of the invention, when taken in conjunction with the accompanying drawings, in which.

DETAILED DESCRIPTION OF THE INVENTION

Figure 1:
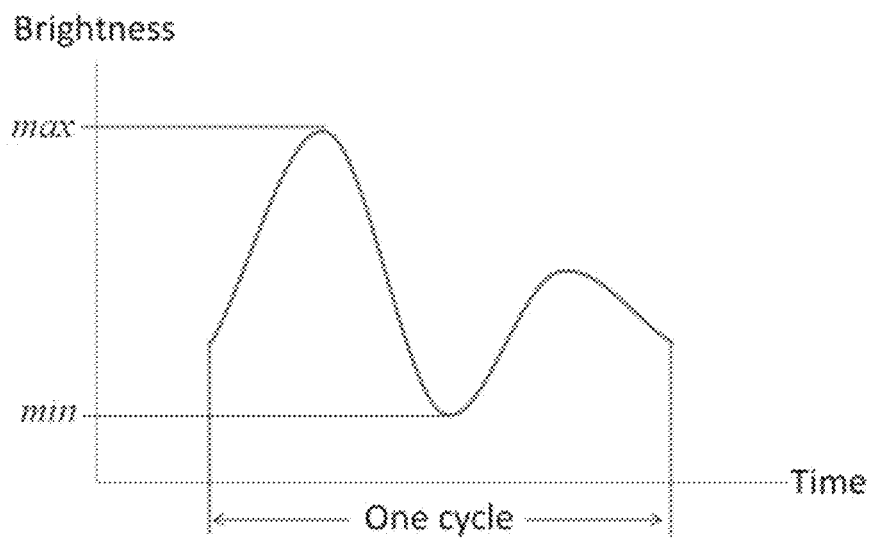
FIG. 1 shows an example of light flicker across time as illustrated by brightness waveform.

The present invention is not to be limited in scope by any of the specific embodiments described herein. The following embodiments are presented for exemplification only.

Without wishing to be bound by theory, the inventors have discovered through their trials, experimentations and research the task of characterizing the behaviour of light flickers captured in photos or videos by a mobile phone camera. This invention also includes algorithms to analyse the flicker behaviour of a light emitting source by examining a photo(s) or video of said light emitting source to estimate flicker-related parameters such as flicker percentage, the order of flicker index and the order of flicker frequency. These values can be used to rank and compare which light emitting source such as a light bulb is having more serious flicker problem. In addition, this invention includes a database for recording the results for later reference and comparisons.

In a first aspect of the present invention there is provided a method and an apparatus for measuring the flickers of light emitting sources comprising using at least one image capturing apparatus in mobile devices wherein there is provided methodologies and algorithms in said mobile devices to analyze the flickers in a one or more captured photos and in a one or more captured videos, wherein further said methodologies and algorithms estimate metrics comprising the percent flicker, the order of flicker index and the order of flicker frequency of said light emitting sources.

In a first embodiment of the first aspect of the present invention there is provided a method and an apparatus wherein said mobile devices comprising smartphones, tablets, laptops, notebooks and computer devices with at least one image capturing apparatus.

In a second embodiment of the first aspect of the present invention there is provided a method and an apparatus wherein said at least one image capturing apparatus comprising at least one still photography camera and at least one video camera and at least one camera can capture both still photography and video.

In a third embodiment of the first aspect of the present invention there is provided a method and an apparatus wherein said methodologies and algorithms comprising modules of Noise Filter, Flicker Identifier, Flicker Analyzer and Database.

In one example of the third embodiment of the first aspect of the present invention there is provided a method and an apparatus wherein after capturing said one or more video said one or more video is passed to the Noise Filter for eliminating motion noise and background noise to produce the Flicker Frame, wherein further the Flicker Analyzer will analyze the flickers from the Flicker Frame and compute metrics estimations of percent flicker, order of flicker index and order of flicker frequency wherein such metrics estimations are recorded in the Database for reference or comparison.

In another example of the third embodiment of the first aspect of the present invention there is provided a method and an apparatus wherein after capturing said one or more photo the Flicker Identifier will compute the Flicker Frame from said one or more photo, which will then be passed to the Flicker Analyzer, wherein further the Flicker Analyzer will analyze the flickers from the Flicker Frame and compute metrics estimations of percent flicker, order of flicker index and order of flicker frequency wherein such metrics estimations are recorded in the Database for reference or comparison.

In a fourth embodiment of the first aspect of the present invention there is provided a method and an apparatus wherein said method is implemented in hardware.

In a fifth embodiment of the first aspect of the present invention there is provided a method and an apparatus wherein said method is implemented in software.

Behaviour of Light Flickers in Photos Captured from Mobile Phone Camera

Percent Flicker

Light flicker is a rapid and repeated change over time in the brightness of light. FIG. 1 shows an example brightness waveform of a light flicker across time. A widely adopted metric, prosed by IESNA lighting experts, defining light flicker is called percent flicker (also known as percentage flicker or flicker percentage). The percent flicker takes the maximum and minimum values of brightness, shown in FIG. 1 as max and min, and performs the following calculation:

$$\text{Percent Flicker} = (\text{max}-\text{min})/(\text{max}+\text{min}) \times 100\% \quad \text{Equation 1:}$$

Figure 2:
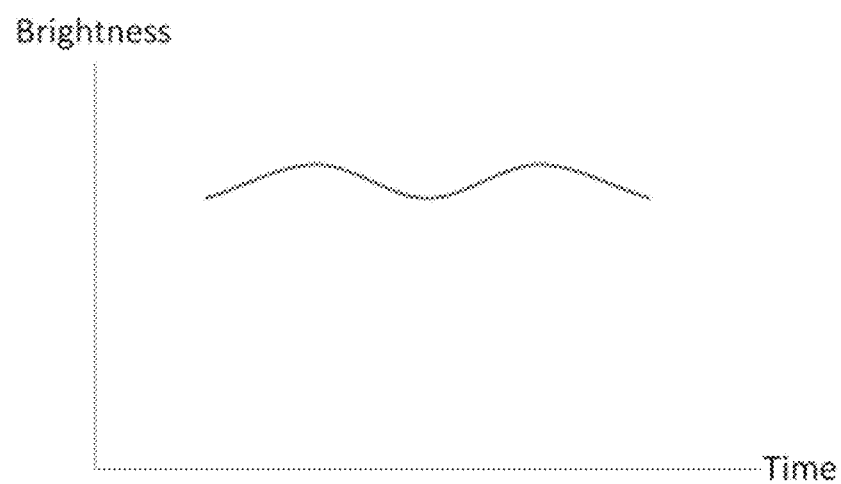
FIG. 2 shows an example brightness waveform of insignificant light flicker.

The larger the percent flicker, the more fluctuation in brightness, the more significant the flicker is. FIG. 2 shows an example waveform of insignificant flicker with little fluctuation, i.e. low percent flicker.

Figure 3:
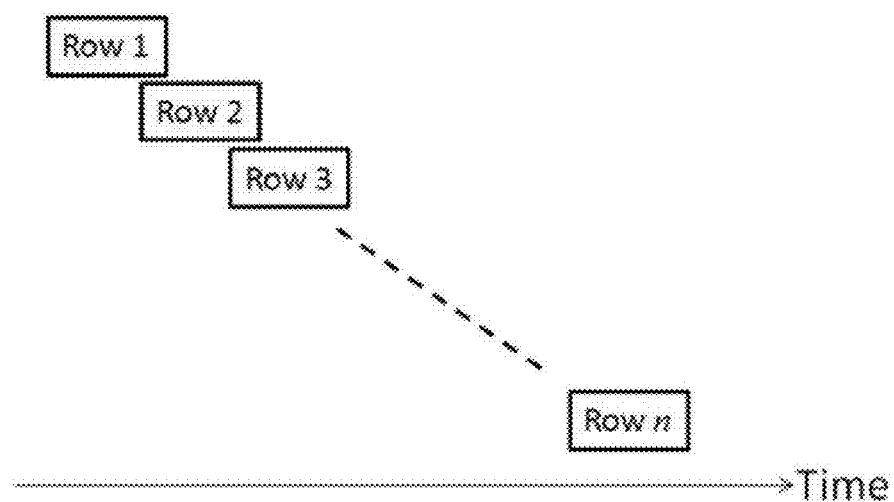
FIG. 3 shows the capture of individual rows over time using rolling shutter.

To minimize overall chip size and cost, most mobile phone cameras use rolling shutters, which capture individual rows of an image one by one at different time as shown in FIG. 3.

Figure 4:
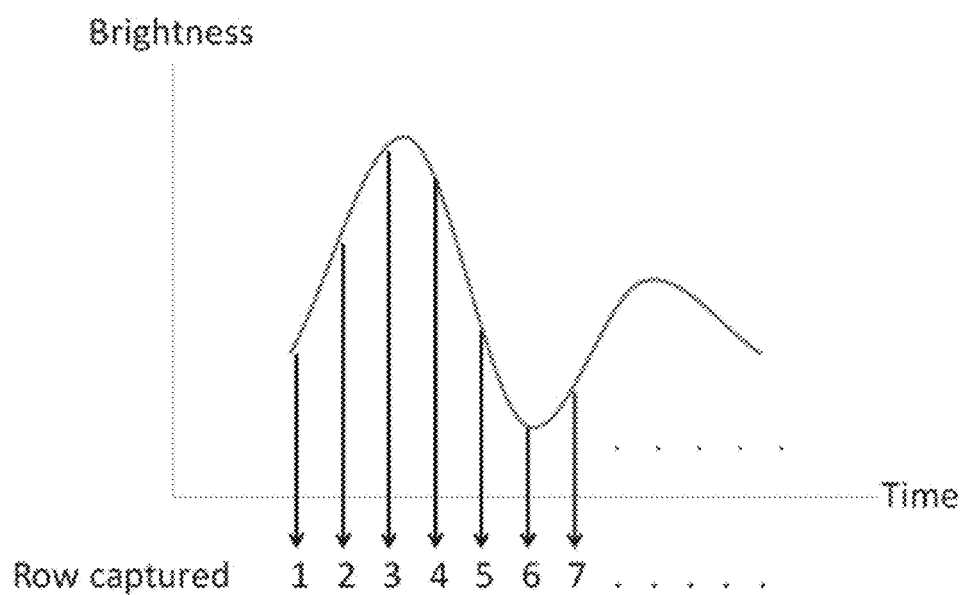
FIG. 4 shows the behavior of flicker brightness in photos captured by rolling shutter.

Combining the brightness waveform of light flicker as shown in FIG. 1 and the capture time of individual rows as shown in FIG. 3, the behaviour of flickers can be explained using FIG. 4.

Figure 5:
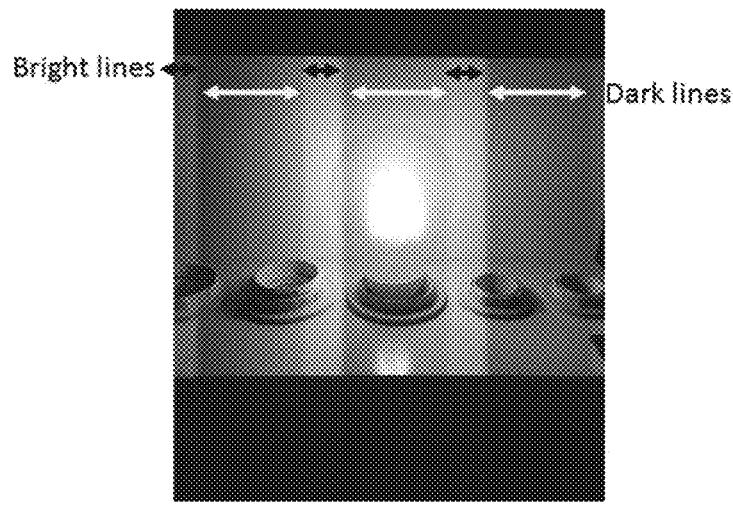
FIG. 5 shows flickers in photo captured by rolling shutter.

In FIG. 4, it can be seen that as the rolling shutter captures individual rows at different time while the brightness is changing, rows captured under higher brightness (e.g. rows 2, 3, 4) will appear as bright lines in the photo while rows captured under lower brightness (e.g. rows 5, 6, 7) will appear as dark lines in the photo (see an example shown in FIG. 5).

From the above analysis, one can estimate the percent flicker of a light emitting source (such as a light bulb) by getting the maximum brightness of the bright lines and the minimum brightness of the dark lines from the photo of a light bulb captured by a rolling shutter (e.g. mobile phone camera). This is an estimation because due to the capture time, rolling shutter speed and flicker frequency, it may not be able to capture the max and min values that are used in Equation 1 for calculating the percent flicker. Also, the brightness in the photo may be affected by factors like background, other light source in the environment, etc. which may not be the same as the true brightness emitted from the bulb.

Due to the limitation of mobile phone cameras, the exact percent flicker cannot be measured. However, this invention describes methodology and algorithms to eliminate noise from photos of a light emitting source (such as a light bulb) captured with camera using rolling shutter (e.g. a mobile phone camera) and obtain an estimation of percent flicker that would give the same ranking order as the values obtained from professional equipment in the laboratory, thus providing handy solution for users to do comparisons on different light emitting sources.

Flicker Frequency

Another metrics measuring the flicker problem is the flicker frequency. Studies have shown that different flicker frequencies cause different biological effects: visible flickers at frequencies ranging from 3 Hz to 70 Hz would cause biological effects like epileptic seizures; invisible flickers ranging from 70 Hz to 165 Hz would cause biological effects like headaches and eye-strain; while biological effects from flickers at frequencies above 165 Hz are negligible.

Some common methods are used to drive light bulbs to operate at frequency twice the AC line frequency. Ideally, the brightness of a bulb is proportional to the current through it. This causes 100 Hz flicker for a 50 Hz mains frequency in North America or 120 Hz flicker for a 60 Hz mains frequency in Europe. But due to factors like driver circuit design, variations in manufacturing, bulbs age, malfunction, etc., bulbs may produce flickers at various frequencies.

Figure 6:
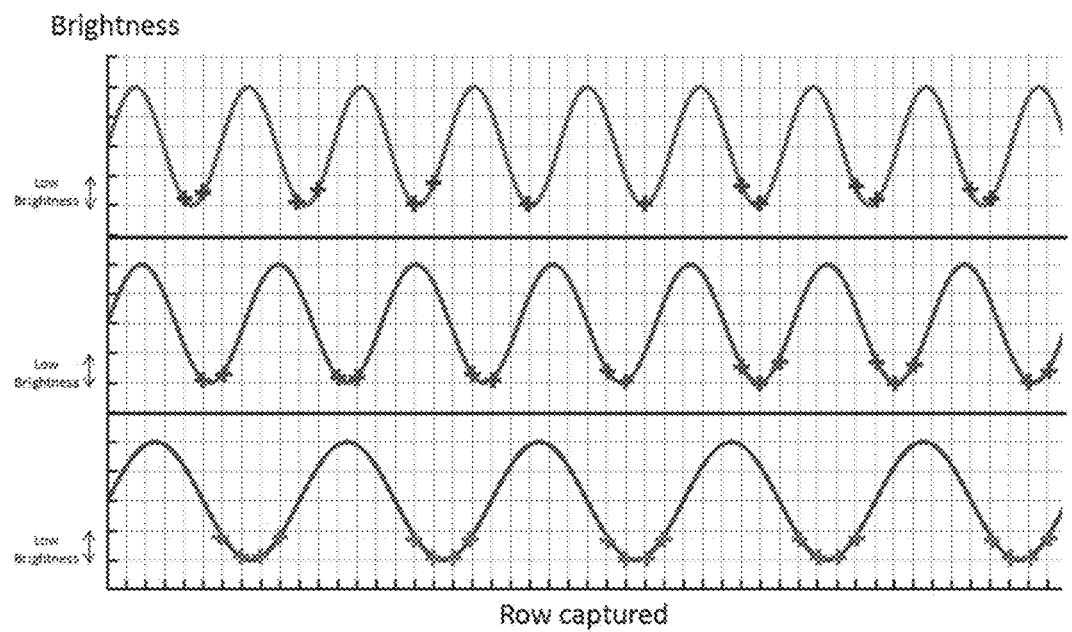
FIG. 6 shows the behavior of flickers with different flicker frequencies in photos captured by rolling shutter.

Combining the capture time of individual rows as shown in FIG. 3 and flickers with different flicker frequencies, the behaviour of flickers can be explained using FIG. 6.

Figure 7A:
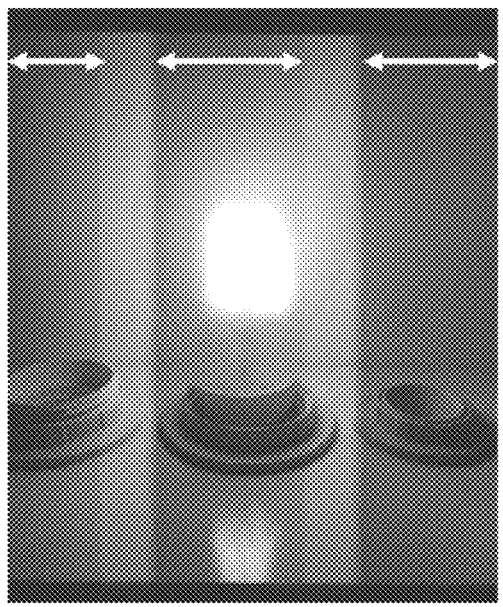
FIGS. 7A-7B shows flickers with different frequencies in photos captured by rolling shutter. (7A) Flickers with lower frequency appear with fewer thicker dark lines in the photo; (7B) Flickers with higher frequency appear with more thinner dark lines in the photo.
Figure 7B:
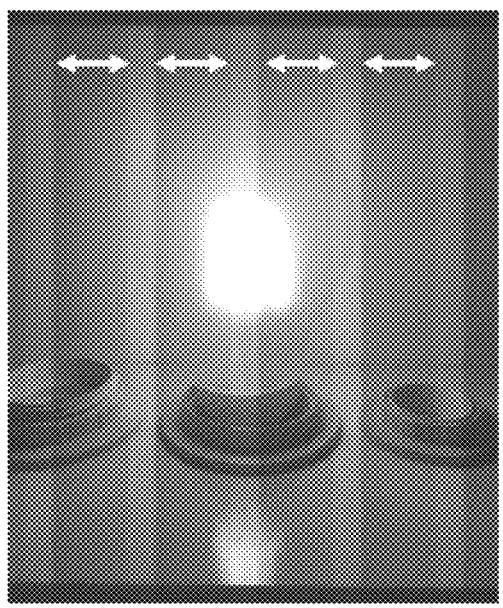

From FIG. 6, it can be seen that the lower the flicker frequency, the more number of continuous rows with low brightness will be captured, that is the dark lines in the photo would be thicker. But within the same time, the lower the flicker frequency, the fewer dark lines would result in the photo. Two examples are shown in FIG. 7.

From the above analysis, the number of dark lines in the photo would help us estimate the order of the flicker frequency. Due to the limitation of mobile phone cameras, we cannot measure the exact value of the flicker frequency. Also, we are not going to estimate the flicker frequency because that may depend on the rolling shutter speed, which may not be known or may vary across different mobile devices. Instead, this invention is going to estimate the order of the flicker frequencies, which is sufficient for users to do comparisons. This estimation is independent of the rolling shutter speed as long as the flickers to be compared are captured with the same mobile device.

Flicker Index

Figure 8A:
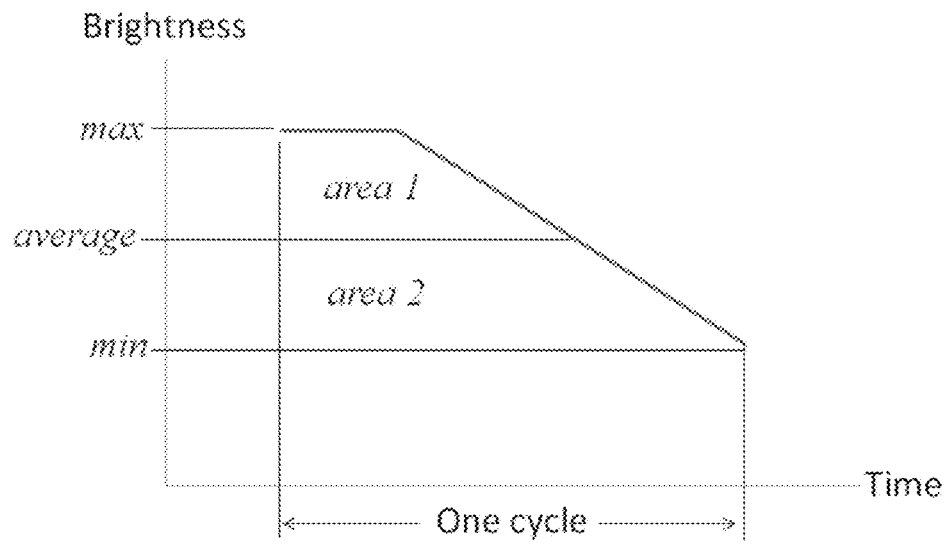
FIGS. 8A-8B shows the brightness waveforms with different flicker indexes. (8A) Brightness waveform with lower flicker index; (8B) Brightness waveform with higher flicker index.
Figure 8B:
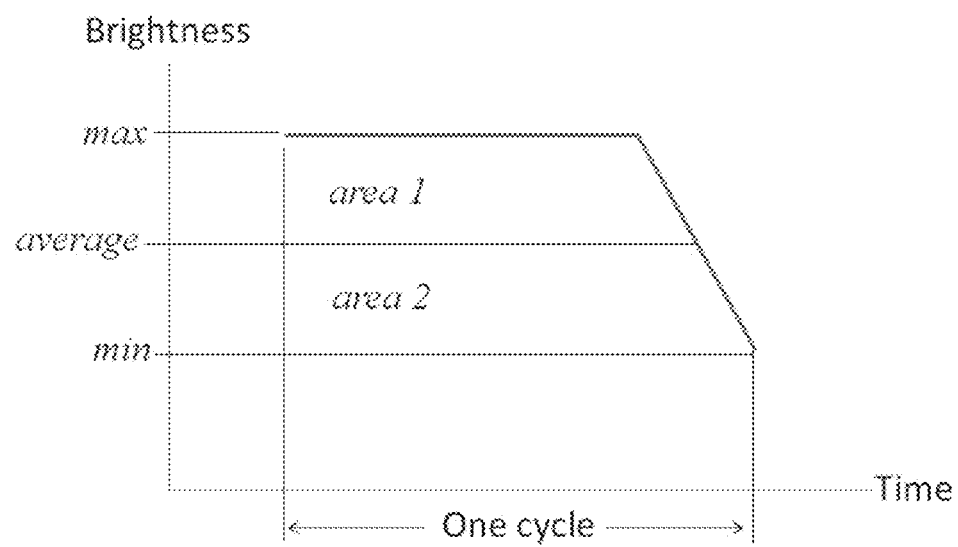
Figure 9A:
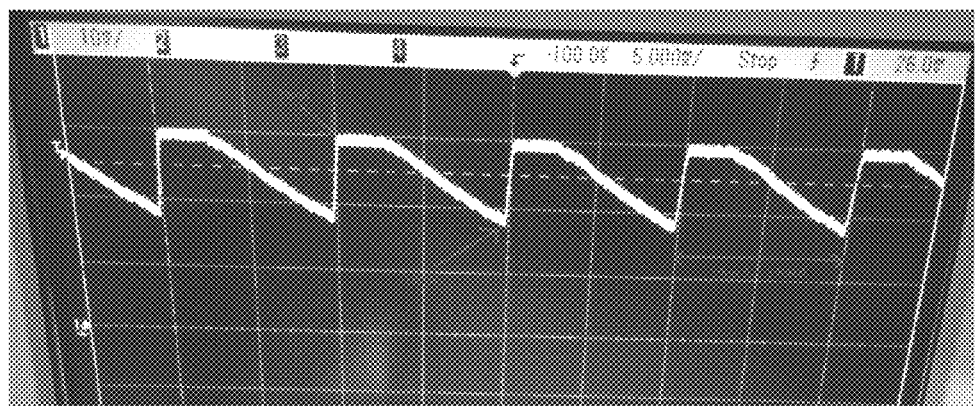
FIGS. 9A-9D shows the AC waveforms of two light bulbs and the corresponding photos captured by rolling shutter. (9A) AC waveform of Light Bulb A (lower flicker index); (9B) AC waveform of Light Bulb B (higher flicker index); (9C) Flicker photo of Light Bulb A; (9D) Flicker photo of Light Bulb B.
Figure 9B:
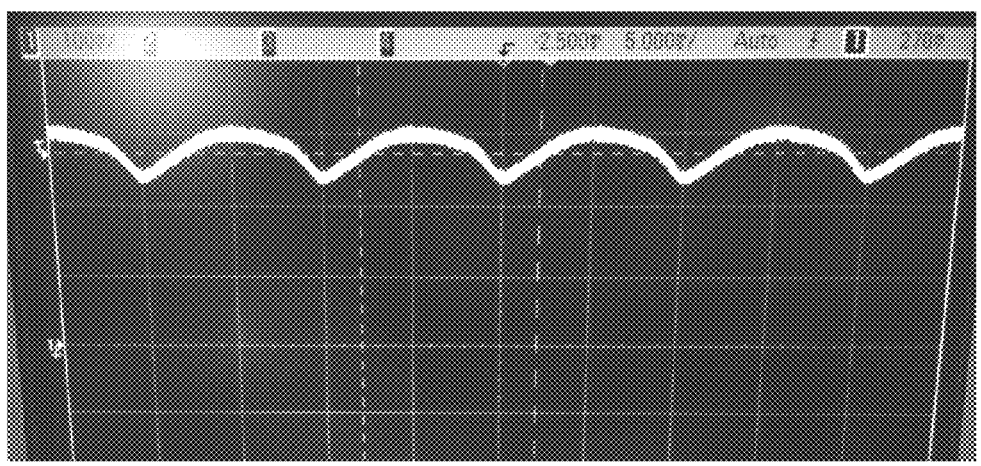
Figure 9C:
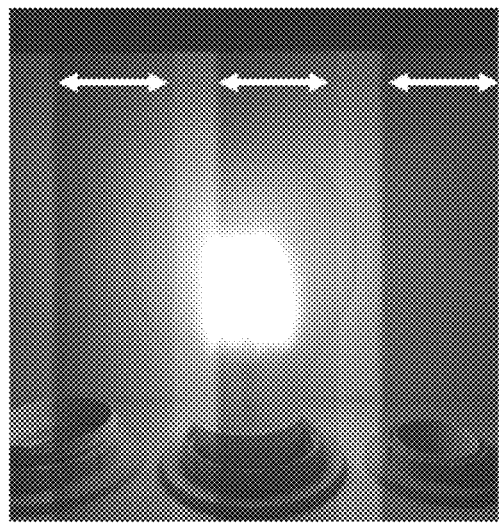
Figure 9D:
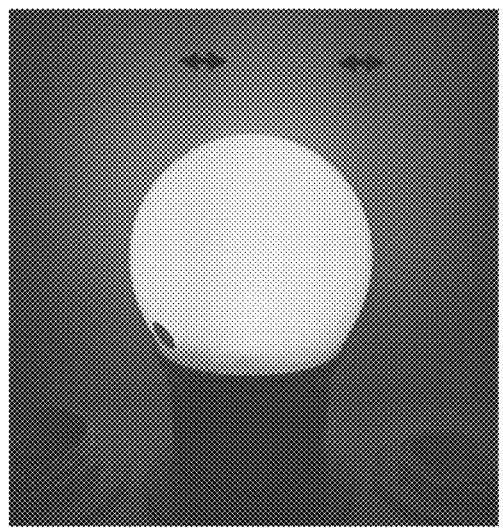

Although most of the light bulbs operate at frequency twice the AC line frequency, some bulbs stay bright for a longer time in a cycle while some bulbs drop in brightness gradually in a cycle. The faster the brightness transition from the maximum value to the minimum value, the more severe the flickering is. Flicker index takes into account this transition by the following calculation:

$$\text{Flicker Index} = \text{Area above Mean/Total Area} \quad \text{Equation 2}$$
$$= \text{area } 1/(\text{area } 1 + \text{area } 2)$$

where area 1 and area 2 are shown in FIG. 8.

Light sources with different flicker indexes also have different behaviours in photos captured by rolling shutter. Two examples are shown in FIG. 9. The two light bulbs shown in FIG. 9 both have flicker frequency of 100 Hz. It can be seen that Light Bulb A stays bright for a shorter time in a cycle and brightness drops more gradually than Light Bulb B (i.e. Light Bulb A is having lower flicker index than Light Bulb B). The gradual drop in brightness is shown as thicker dark lines in the photo (while the darkness of the flicker lines is related to the percent flicker of the light bulb).

From the above analysis, we can estimate the order of flicker indexes by calculating the thickness of the dark lines in the photo. This is an estimation because due to the limitation of mobile phone cameras, we cannot measure the exact max and min values or the cycle time that are used in Equation 2 for calculating the flicker index.

Summarizing the above analysis, we can estimate the metrics percent flicker, the order of flicker index and the order of flicker frequency by analysing the brightness, thickness and the number of dark lines in the photos captured by rolling shutter. Again, accuracy of the estimations may be affected by factors like background, other light source in the environment, etc. This invention further describes methodology and algorithms to eliminate such noise from the photos and perform estimations, which can give the same ranking order as the values obtained from professional equipment in the laboratory, thus providing handy comparisons to users.

Methodology and Algorithm

Figure 10:
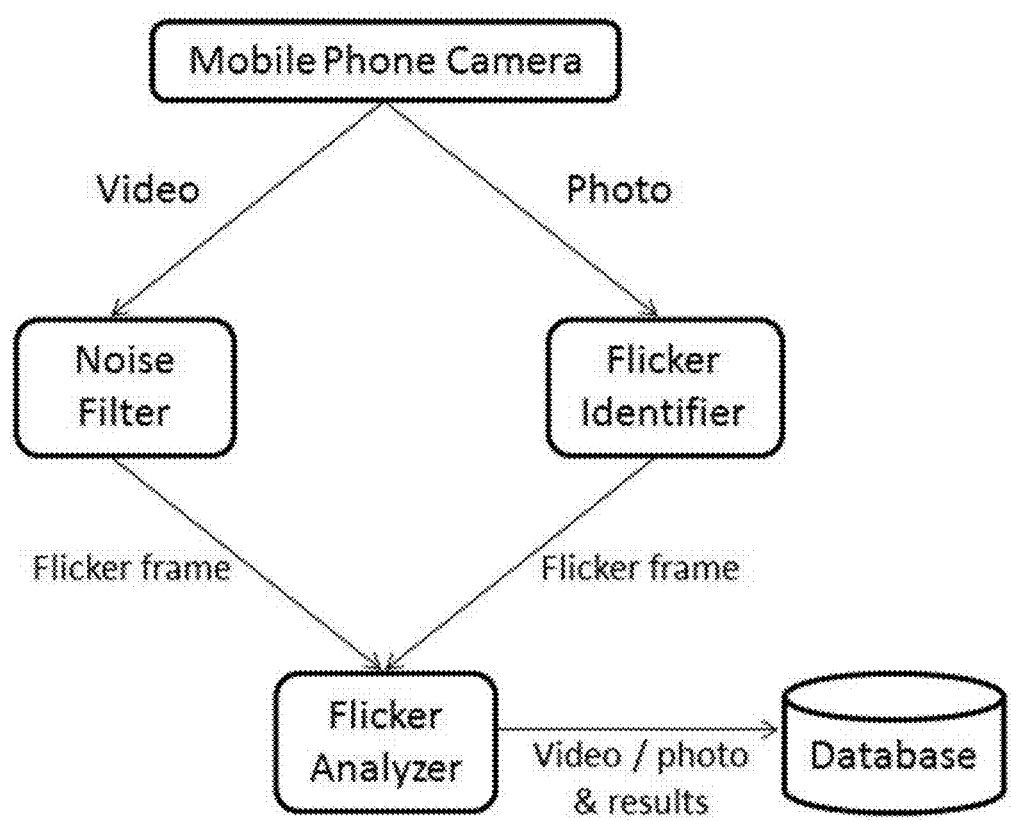
FIG. 10 shows one embodiment of a system executing the methodologies and algorithms described herein.

FIG. 10 shows one embodiment of the present invention, which composes of a Noise Filter, Flicker Identifier, Flicker Analyzer and a Database. After taking a video of a light source such as a light bulb from an image capturing device with rolling shutter (such as a mobile phone camera), the video is passed to the Noise Filter to eliminate motion and background noise, and to produce the Flicker Frame. The Flicker Analyzer will then analyze the flickers from the Flicker Frame and compute estimations of percent flicker, order of flicker index and order of flicker frequency. With a single photo of light bulb, the Flicker Frame will be computed by the Flicker Identifier and then passed to the Flicker Analyzer. After that, the video/photo together with the results will be recorded in the Database for later reference or comparison.

Flicker Identifier

In one embodiment, the Flicker Identifier identifies the flicker dark lines in the photo and produces the Flicker Frame by the following algorithm:

---

Algorithm for identifying flicker dark lines from a photo:

1. For every pixel (x, y), obtain the brightness $B_{x,y}$ by the following formula:
   $B_{x,y}$ = 0.299r + 0.587g + 0.114b where r, g, b are the red, green and blue value of the pixel
2. Quantize the value of brightness $B_{x,y}$ by the following formula:
   $Q(B_{x,y})$ = ⌊ $B_{x,y}$ / (255 / q) ⌋ where q is the quantization parameter
3. For every row[1] y,
   - set dark level $d_{x, y}$ = 1 if $Q_{low\_start} \leq x \leq Q_{low\_end}$, and $Q(B_{x,y})$ > minimum of $Q(B_{x,y})$ $\forall$x, y,
     where $Q_{low\_start}$ = x if $Q(B_{x,y})$ < $Q(B_{x-1,y})$ and $Q_{low\_end}$ = x if $Q(B_{x,y})$ < $Q(B_{x+1,y})$
   - set white level $w_{x, y}$ = 1 if $Q_{high\_start} \leq x \leq Q_{high\_end}$, and $Q(B_{x,y})$ < maximum of $Q(B_{x,y})$ $\forall$x, y,
     where $Q_{high\_start}$ = x if $Q(B_{x,y})$ > $Q(B_{x-1,y})$ and $Q_{high\_end}$ = x if $Q(B_{x,y})$ > $Q(B_{x+1,y})$
4. For every column[2] x, set column output $c_x$ = 1 if $\sum_{y=0}^{image\_height-1} d_{x,y} > \sum_{y=0}^{image\_height-1} w_{x,y}$, otherwise set $c_x$ = 0

[1] In this invention, row means the lines of pixels that are perpendicular to the flicker dark lines in the photo.
[2] In this invention, column means the lines of pixels that are parallel to the flicker dark lines in the photo.

---

Figure 11A:
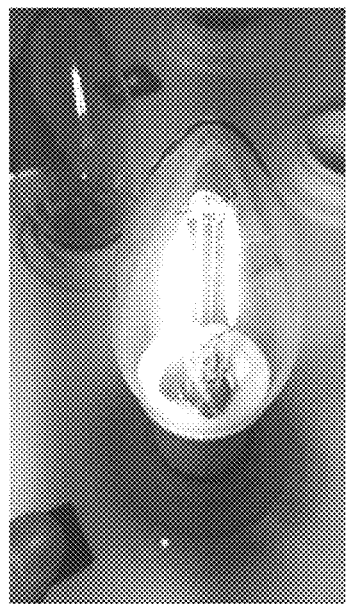
FIGS. 11A-11B shows (11A) an input photo and (11B) one embodiment of the output Flicker Frame from the Flicker Identifier described herein.
Figure 11B:
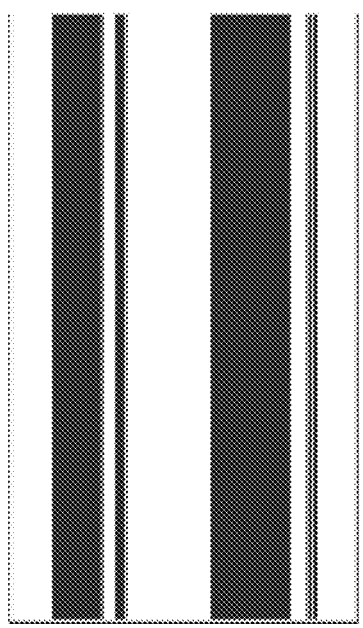

FIG. 11 shows an input photo of a light bulb and the output Flicker Frame from the Flicker Identifier, from which it can be seen that background noise can be eliminated and the flicker dark lines can be identified from the photo.

Flicker Analyzer

In one embodiment, the Flicker Analyzer estimates the percent flicker, the order of flicker index and the order of flicker frequency by the following algorithms:

---

Algorithm for estimating the percent flicker:

1. Among all pixels (dx, dy) where $d_{dx, dy}$ = 1 and $Q(B_{dx, dy})$ > minimum of $Q(B_{x,y})$ $\forall$x, y, find the minimum brightness $min_{Bdx,dy}$ from the input photo
2. Among all pixels (wx, wy) where $w_{wx, wy}$ = 1 and $Q(B_{wx, wy})$ < maximum of $Q(B_{x,y})$ $\forall$x, y, find the maximum brightness $max_{Bwx,wy}$ from the input photo
3. Calculate the percent flicker estimation as:
   percent flicker estimation: $f_{percent}$ = ($max_{Bwx,wy}$ − $min_{Bdx,dy}$) / ($max_{Bwx,wy}$ + $min_{Bdx,dy}$)

---

Algorithm for estimating the order of flicker frequency and the order of flicker index:

1. Let F be the set of (i, j) where i, j∈ [0, image_width), j > i, $c_i$ = $c_j$ = 1, and $c_x$ = $c_{x+1}$ = 1 $\forall$x∈[i, j), find the thickness of a flicker dark line $t_{i, j}$ = $\sum_{x=i}^{j} c_x$ for all (i, j) ∈ F 2. Let $F^T$ be the set of (i, j) where (i, j) ∈ F and $t_{i, j}$ > T × maximum of $t_{i, j}$ $\forall$(i, j) ∈ F, where T ∈ (0, 1) is the valid threshold, estimate the order of
   flicker frequency: f_freq = | $F^T$ |
   and flicker index: f_idx = $\Sigma_{(i,j) \in F^T} t_{i,j}$ / | $F^T$ | / image_width

---

The range of percent flicker estimation $f_{percent}$ is in [0, 1] where the larger the $f_{percent}$, the more fluctuation in brightness, and the more significant the flicker is. The estimation of the order of flicker frequency f_freq gives a value for relative comparison where the smaller the f_freq, the lower the flicker frequency, and the more biological effects the flicker would cause. The estimation of the order of flicker index f_idx gives a value for relative comparison where the larger the f_idx, the lower the flicker index, the less severe the flickering is.

Noise Filter

Figure 12A:
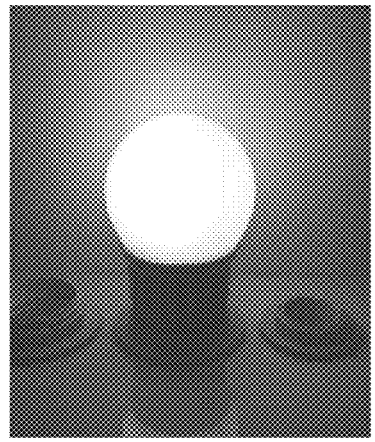
FIGS. 12A-12C shows an example of successive input frames and an output Flicker Frame from the Noise Filter. (12A) Frame $V_{n-1}$; (12B) Frame $V_n$; (12C) Output flicker frame from the Noise Filter.

Accuracy of the Flicker Analyzer depends on how the flicker dark lines in the Flicker Frame are reflecting the flicker dark lines in the input photo. In single-frame analysis, approximation of the flicker dark lines may be affected by the background noise of the input photo. Or if the percent flicker is low, the flicker lines in the photo may not be dark enough to be identified, thus affecting the accuracy of the estimations, an example is shown in FIG. 12(A).

To improve accuracy, the present invention provides a video analysis. However, motion noise may be introduced to the video if the user has hand shaking while taking the video. In one embodiment, with a video of a light bulb from the mobile phone camera, the Noise Filter first extracts two successive frames from the video which are having the least motion noise, and then produces the flicker frame by eliminating background noise, with the following algorithm:

---

Algorithm for eliminating motion and background noise from the video and producing the Flicker Frame:

Let $V_n(x, y)$ be pixel (x, y) from frame n of a video V,
1. Compute the difference between $V_n$ and $V_{n-1}$: $D_{n, n-1}$ = $\Sigma_{\forall(x,y)} V_n(x,y) - V_{n-1}(x,y)$
2. Compute the difference frame $V_{D_{n,n-1}}$ from any two successive frames $V_n$ and $V_{n-1}$ where $D_{n, n-1}$ is minimum for all n > 0, where $V_{D_{n,n-1}}(x,y) = V_n(x,y) - V_{n-1}(x,y)$
3. For every column x, set column output $c_x$ = 1 if $|V_{D_{n,n-1}}(x,y) < 0| > |V_{D_{n,n-1}}(x,y) > 0|$, otherwise set $c_x$ = 0

---

Figure 12B:
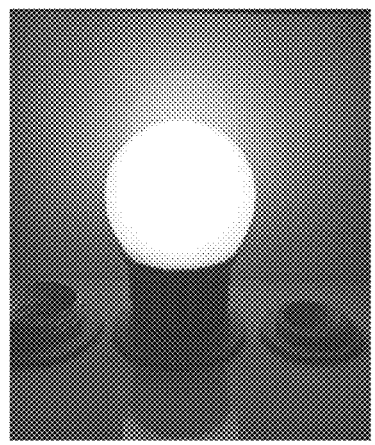
Figure 12C:
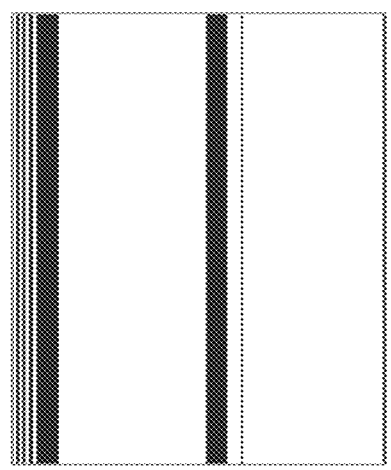

FIG. 12 shows two successive frames extracted from the video of a light bulb and the output Flicker Frame from the Noise Filter, from which it can be seen that background noise can be eliminated and the flicker dark lines can be identified even the percent flicker of the light bulb is low and the flicker lines are not very visible.

Database

In one embodiment, the database records the video/photo together with the results (percent flicker estimation $f_{percent}$, order of flicker frequency f_freq, and order of flicker index f_idx) for later reference and comparison.

Results and Discussions

Estimation of the Order of Flicker Frequency f_Freq

Since flickers with frequencies below 70 Hz is said to be visible to human while invisible flickers ranging from 70 Hz to 165 Hz would cause various biological effects but biological effects from flickers at frequencies above 165 Hz are negligible, we focus our experiments in the invisible frequency range 70 Hz-220 Hz to see whether this invention is able to identify which light bulb has higher flicker frequency that would cause less significant biological effects. The following table shows the results of photo analysis and video analysis of 9 samples with various flicker frequencies:

| | | Photo Analysis | | Video Analysis | |
|---|---|---|---|---|---|
| Sample | Flicker Frequency | f_freq | Interpretation of f_freq | f_freq | Interpretation of f_freq |
| F1 | 80 | 2 | 60-90 Hz | 2 | 60-90 Hz |
| F2 | 100 | 3 | 90-120 Hz | 3 | 90-120 Hz |
| F3 | 100 | 3 | 90-120 Hz | 3 | 90-120 Hz |
| F4 | 100 | 3 | 90-120 Hz | 3 | 90-120 Hz |
| F5 | 110 | 3 | 90-120 Hz | 3 | 90-120 Hz |
| F6 | 120 | 4 | 120-150 Hz | 0 | X |
| F7 | 150 | 5 | 150-180 Hz | 0 | X |
| F8 | 190 | 6 | 180-210 Hz | 6 | 180-210 Hz |
| F9 | 220 | 7 | 210-240 Hz | 7 | 210-240 Hz |

From the results, it can be seen that the estimation of the order of flicker frequency f_freq can be used to identify flicker frequencies in different ranges. However, since the frame rate of taking video with a mobile phone camera is 30 frames per second, flickers with frequencies at multiple of 30 Hz (Sample F6 and F7) may appear as quite steady in the videos, making the video analysis not applicable. This is a limitation due to the mobile phone camera setting. In those cases, estimation can be obtained by photo analysis.

Another experiment is to use laboratory equipment to operate Sample F9 at various flicker frequencies. The following table shows the estimation f_freq from photo analysis and video analysis as well as the estimation of the thickness of the flicker dark lines in the photos or videos.

| | Photo Analysis | | | Video Analysis | | |
|---|---|---|---|---|---|---|
| Flicker Frequency | f_freq | Interpretation of f_freq | Thickness of flicker dark lines | f_freq | Interpretation of f_freq | Thickness of flicker dark lines |
| 80 | 2 | 60-90 Hz | 524 | 2 | 60-90 Hz | 311 |
| 90 | 3 | 90-120 Hz | 452 | | not applicable | |
| 100 | 3 | 90-120 Hz | 384 | 3 | 90-120 Hz | 287 |
| 110 | 3 | 90-120 Hz | 359 | 3 | 90-120 Hz | 241 |
| 120 | 4 | 120-150 Hz | 341 | | not applicable | |
| 130 | 4 | 120-150 Hz | 297 | 4 | 120-150 Hz | 212 |
| 140 | 4 | 120-150 Hz | 281 | 4 | 120-150 Hz | 187 |
| 150 | 4 | 120-150 Hz | 257 | | not applicable | |
| 160 | 5 | 150-180 Hz | 245 | 5 | 150-180 Hz | 167 |
| 170 | 5 | 150-180 Hz | 230 | 5 | 150-180 Hz | 154 |
| 180 | 6 | 180-210 Hz | 227 | | not applicable | |
| 190 | 6 | 180-210 Hz | 224 | 6 | 180-210 Hz | 138 |
| 200 | 7 | 210-240 Hz | 217 | 6 | 180-210 Hz | 132 |
| 210 | 7 | 210-240 Hz | 200 | | not applicable | |
| 220 | 7 | 210-240 Hz | 177 | 7 | 210-240 Hz | 89 |

From the results, we can see that although the estimation f_freq only tells the flicker frequency range, we can use the thickness of the flicker dark lines to arrange the order of the flicker frequencies as the thickness decreases with the frequency (as described in [0039-0044]). This means that this invention can be used to check whether a light bulb degrades (changing from a higher flicker frequency to a lower flicker frequency) as it ages. However, only the thickness of the flicker dark lines cannot be used to estimate the order of different flicker frequencies of different light bulbs as the thickness of flicker dark lines is also affected by the flicker index of the light bulb.

Estimation of the Order of Flicker Index f_idx

As described in [0045-0048], the lower the flicker index, the higher the estimation f_idx. The following table shows the results of photo analysis and video analysis of 11 samples with various flicker indexes:

| Sample | Flicker Index | Photo Analysis f_idx | Video Analysis f_idx | Remark |
|---|---|---|---|---|
| I1 | No Flicker | 0.042708 | 0 | Flicker lines cannot be identified in the photos. |
| I2 | No Flicker | 0.076388 | 0 | |
| I3 | 0.33333 | 0.248148 | 0.316203 | |
| I4 | 0.35000 | 0.153867 | 0.269444 | Result of photo analysis is affected by background noise information. |
| I5 | 0.36538 | 0.208796 | 0.244907 | |
| I6 | 0.43181 | 0.054166 | 0.205555 | Flicker lines cannot be identified in the photos. |
| I7 | 0.43870 | 0.201252 | 0.184259 | |
| I8 | 0.44696 | 0.158333 | 0.164583 | |
| I9 | 0.45117 | 0.113153 | 0.148456 | |
| I10 | 0.46000 | 0.071370 | 0.077314 | |
| I11 | 0.46000 | 0.061410 | 0.056018 | |

The results show that this invention is able to identify light bulbs with different flicker index and arrange their order according to the estimation f_idx. However, as shown in Sample I4, it is possible that result of photo analysis may be affected by background noise information in the photo. Another limitation is shown in Sample I6, which is having low percent flicker producing relatively bright flicker dark lines in the photo, which cannot be identified, but video analysis can be used to obtain estimation in this case.

Estimation of Percent Flicker $f_{percent}$

The following table shows the results of photo analysis and video analysis of 11 samples with various percent flicker:

| Sample | Percent Flicker | Photo Analysis $f_{percent}$ | Video Analysis $f_{percent}$ | Remark |
|---|---|---|---|---|
| P1 | No Flicker | 0.770833 | 0 | Result of photo analysis is affected by background noise information. |
| P2 | No Flicker | 0.722973 | 0 | |
| P3 | 0.12958 | 0.770833 | 0.770833 | |
| P4 | 0.13812 | 0.770833 | 0.770833 | |
| P5 | 0.22541 | 0.821429 | 0.814946 | |
| P6 | 0.23404 | 0.821429 | 0.821429 | |
| P7 | 0.26961 | 0.821429 | 0.821429 | |
| P8 | 0.62617 | 0.954023 | 0.881919 | |
| P9 | 0.86192 | 0.992188 | 0.954023 | |
| P10 | 0.90244 | 0.994946 | 0.997407 | |
| P11 | 1.00000 | 0.995216 | 0.998621 | |

The results show that this invention is able to identify light bulbs with different percent flicker and arrange their order according to the estimation $f_{percent}$. However, as shown in Samples P1 and P2, it is possible that result of photo analysis may be affected by background noise information in the photo.

CONCLUSION

This invention examines the behaviour of light flickers of a light source captured in photos or videos by a camera with rolling shutter (such as mobile phone camera), and provides methodology and algorithms to analyse the flicker-related parameters such as the percent flicker, the order of flicker index and the order of flicker frequency. Due to the limitation of mobile phone camera, the exact values cannot be measured, but experiments show that the estimations obtained from this invention match with the ranking order of values obtained from the laboratory. Hence, this invention provides a handy solution for users to compare the flicker problem of different light sources.

In estimating the order of flicker frequency, due to the limitation of mobile phone camera setting, video analysis may not work for frequencies at multiple of 30 Hz, but estimations can still be obtained from photo analysis. Another limitation is the Flicker Identifier of the photo analysis: accuracy may be affected by background noise information in the photo, or it may not be able to identify the relatively bright flicker lines from a single photo produced by light sources with low percent flicker, but estimations can be obtained from video analysis in those cases. Furthermore, it is known to a person skilled in the art that should the frame capture rate of the mobile device be higher, the present invention can be applied to analyze light sources with flicker frequencies. Embodiments of the present invention provided herein are merely limited by the hardware parameters of the mobile devices used and not the underlying inventive algorithms and inventions therein.

The present invention discloses a method of measuring the flickers of light emitting sources using image capturing apparatus in mobile devices. In one embodiment, the present invention relates to a method of measuring the flickers of light emitting sources using image capturing apparatus in mobile devices for quality checking and quality control of said light emitting sources.

If desired, the different functions discussed herein may be performed in a different order and/or concurrently with each other. Furthermore, if desired, one or more of the above-described functions may be optional or may be combined.

In one embodiment, this invention provides a method of determining flicker-related parameters of a light emitting source, comprising the steps of: a) acquiring one or more photo images or video images of a light emitting source with an image capturing device that comprises rolling shutter; b) generating, with a processor, from said photo images or video images a flicker frame comprising one or more flicker dark lines, wherein each flicker dark lines has an output column value of 1; and c) generating, with a processor, one or more flicker-related parameters based on said flicker frame, thereby determining the flicker-related parameters of said light emitting source.

In one embodiment, said flicker-related parameters are selected from the group consisting of percent flicker, order of flicker frequency, and order of flicker index.

In one embodiment, said flicker frame is produced from said video images by the steps comprising: a) determining the sum of the differences in pixel values between corresponding pixels in successive frames of the video image, wherein any two successive frames, a first frame and a second frame, that have the smallest difference are the frames that have the least motion noise; b) subtracting the pixel value of each pixel on said first frame from the pixel value of the corresponding pixel on said second frame to obtain changes in pixel values over time; c) assigning a column output value of "1" to each column of pixels in said video image wherein in each of said column, the number of pixels having decreased pixel value over time is more than the sum of the number of pixels having increased pixel value over time; d) assigning a column output value of "0" to each columns of pixels in said video image wherein in each of said column, the number of pixels having decreased pixel value over time is not more than the sum of the number of pixels having increased pixel value over time and the number of pixels having no change in pixel value over time; and e) assembling a flicker frame by drawing each of said column of pixels where its column output value is "1" in the order each corresponding column of pixels is acquired in the video image.

In one embodiment, said flicker frame is produced from said photo image with the steps comprising: a) obtaining a brightness value for each pixel in said photo image; b) quantizing said brightness value of each pixel in said photo image; c) assigning a dark level value of "1" to the pixels on each row of the image that are bounded by a first pixel and a second pixel, wherein the quantized value of said first pixel is smaller than its preceding pixel in the same row and the quantized value of said second pixel is smaller than its succeeding pixel in the same row, and further wherein the quantized value of said first and second pixels are greater than the minimum of quantized value for all pixels in said photo image; d) assigning a white level value of "1" to the pixels on each row of the image that are bounded by a first pixel and a second pixel, wherein the quantized value of said first pixel is larger than its preceding pixel in the same row and the quantized value of said second pixel is larger than its succeeding pixel in the same row, and further wherein the quantized value of said first and second pixels are less than the maximum of quantized value for all pixels in said photo image; e) assigning a column output value of "1" to each column of pixels in said photo image wherein each of said column has more pixels assigned with dark level value "1" than pixels assigned with white level value "1"; f) assigning a column output value of "0" to each column of pixels in said photo image wherein each of said column has less or same number of pixels assigned with dark level value "1" compared to pixels assigned with white level value "1"; and g)

assembling a flicker frame by drawing each of said column of pixels where its column output value is "1" in the order each corresponding column of pixels is acquired in the photo image. In another embodiment, said brightness value is obtained by the formula: Brightness, $B_{x,y}$, =0.299r+0.587g+ 0.114 b wherein r, g and b are the red, green and blue value of the pixel respectively. In a further embodiment, said quantized value $Q(B_{x,y})$ is obtained by the formula:

$$Q(B_{x,y}) = \frac{B_{x,y}}{(255/q)}$$

wherein q is a quantization parameter.

In one embodiment, a value for percent flicker is calculated by the steps comprising: a) determining a minimum brightness value from all pixels that have (i) a dark level value of "1" and (ii) a quantized value greater than the minimum of the quantized value for all pixels in said photo image; b) determining a maximum brightness value from all pixels that have (i) a white level value of "1" and (ii) a quantized value less than the maximum of the quantized value for all pixels in said photo image; and c) calculating the percent flicker as:

$$\frac{\text{maximum brightness} - \text{minimum brightness}}{\text{maximum brightness} + \text{minimum brightness}}.$$

In one embodiment, said order of flicker frequency is calculated by the steps comprising: a) determining a thickness value of each flicker dark line in said flicker frame by summing the number of columns between a starting column and an ending column, wherein all columns between said starting column and said ending column inclusively have column output value of 1; and b) computing an order of flicker frequency by summing up the number of flicker dark lines above a threshold value, wherein said threshold value is T×maximum thickness of all flicker dark lines, and T is a threshold parameter between 0 and 1.

In one embodiment, said order of flicker index is calculated by the steps comprising: a) determining a thickness value of each flicker dark line in said flicker frame by summing the number of columns between a starting column and an ending column, wherein all columns between said starting column and said ending column inclusively have column output value of 1; b) computing an average thickness from all said thickness values that are above a threshold, wherein said threshold is T×maximum thickness of all flicker dark lines, and T is a threshold parameter between 0 and 1; and c) computing an order of flicker index by normalizing said average thickness with the width of the flicker frame.

In one embodiment, said image capturing device is a mobile device selected from the group consisting of a smart phone, a laptop computer, a tablet computer, and a digital camera.

In one embodiment, said light emitting source is an incandescent light bulb, a compact fluorescent lamps, or a Light Emitting Diode lamps (LEDs).

In one embodiment, said method further comprises the step of storing said flicker-related parameters with the corresponding image or video in a database. In another embodiment, said method further comprises the step of comparing and ranking said flicker-related parameters.

In one embodiment, this invention provides a device for determining flicker-related parameters of a light emitting source, comprising: a) an image capturing device that comprises rolling shutter for acquiring an image or video of said light emitting source; b) one or more processors for generating from a captured image (i) a flicker frame comprising one or more flicker dark lines, and (ii) one or more flicker-related parameters from said flicker frame; and c) a memory for storing said image or video and said flicker-related parameters.

In one embodiment, said device further comprises one or more processors for refining said flicker frame by processing a video image.

In one embodiment, said flicker-related parameter is selected from the group consisting of percent flicker, order of flicker frequency, and order of flicker index.

In one embodiment, said flicker dark lines are determined by said one or more processors upon executing the steps comprising: a) obtaining a brightness value for each pixel in said captured image; b) obtaining a quantized value for each of said brightness value; c) assigning a dark level value of "1" to pixels on each row of the image that are bounded by a first pixel and a second pixel, wherein the quantized value of said first pixel is smaller than its preceding pixel in the same row and the quantized value of said second pixel is smaller than its succeeding pixel in the same row and further wherein the quantized value of said first and second pixels are greater than the minimum of the quantized value for all pixels in said captured image; d) assigning a white level value of "1" to pixels on each row of the image that are bounded by a first pixel and a second pixel, wherein the quantized value of said first pixel is larger than its preceding pixel in the same row and the quantized value of said second pixel is larger than its succeeding pixel in the same row and further wherein the quantized value of said first and second pixels are less than the maximum of quantized value for all pixels in said captured image; e) assigning a column output value of "1" to each column of pixels in said photo image wherein each of said column has more pixels assigned with dark level value "1" than pixels assigned with white level value "1"; f) assigning a column output value of "0" to each column of pixels in said captured image wherein each of said column has less or same number of pixels assigned with dark level value "1" compared to pixels assigned with white level value "1"; and g) assembling a flicker frame by drawing each of said column of pixels where its column output value is "1" in the order each corresponding column of pixels is acquired in the captured image.

In one embodiment, said image capturing device is a smart phone, laptop computer, tablet computer, or a digital camera.

In one embodiment, this invention provides a non-transitory computer-readable medium with instructions stored thereon, that when executed by a processor, perform the steps comprising: a) obtaining a brightness value for each pixel in a captured image; b) obtaining a quantized value for each of said brightness value; c) assigning a dark level value of "1" to pixels on each row of the image that are bounded by a first pixel and a second pixel, wherein the quantized value of said first pixel is smaller than its preceding pixel in the same row and the quantized value of said second pixel is smaller than its succeeding pixel in the same row and further wherein the quantized value of said first and second pixels are greater than the minimum of the quantized value for all pixels in said captured image; d) assigning a white level value of "1" to pixels on each row of the image that are bounded by a first pixel and a second pixel, wherein the quantized value of said first pixel is larger than its preceding pixel in the same row and the quantized value of said second pixel is larger than its succeeding pixel in the same row and further wherein the quantized value of said first and second pixels are less than the maximum of the quantized value for all pixels in said captured image; e) assigning a column output value of "1" to each column of pixels in said photo image wherein each of said column has more pixels assigned with dark level value "1" than pixels assigned with white level value "1"; f) assigning a column output value of "0" to each column of pixels where each such column has less or same number of pixels assigned with dark level value "1" compared to pixels assigned with white level value "1"; and g) assembling a flicker frame by drawing each column of pixels where its column output value is "1" in the order each corresponding column of pixels is acquired in the captured image.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the reminder of the disclosure in any way whatsoever. Without further elaboration, it is believed that one skilled in the art can, based on the description herein, utilize the present invention to its fullest extent. All publications recited herein are hereby incorporated by reference in their entirety.

What is claimed is:

1. A method of determining flicker-related parameters of a light emitting source, comprising the steps of:
    (a) acquiring one or more video images of a light emitting source with an image capturing device that comprises rolling shutter;
    (b) generating, with a processor, from said video images a flicker frame comprising one or more flicker dark lines, wherein each flicker dark lines has an output column value of 1; and
    (c) generating, with a processor, one or more flicker-related parameters based on said flicker frame, thereby determining the flicker-related parameters of said light emitting source;
    wherein said flicker frame is produced from said video images by the steps comprising:
    (a) determining the sum of the differences in pixel values between corresponding pixels in successive frames of the video images, wherein any two successive frames, a first frame and a second frame, that have the smallest difference are the frames that have the least motion noise;
    (b) subtracting the pixel value of each pixel on said first frame from the pixel value of the corresponding pixel on said second frame to obtain changes in pixel values over time;
    (c) assigning a column output value of "1" to each column of pixels in said video images wherein in each of said column, the number of pixels having decreased pixel value over time is more than the sum of the number of pixels having increased pixel value over time;
    (d) assigning a column output value of "0" to each columns of pixels in said video images wherein in each of said column, the number of pixels having decreased pixel value over time is not more than the sum of the number of pixels having increased pixel value over time and the number of pixels having no change in pixel value over time; and
    (e) assembling a flicker frame by drawing each of said column of pixels where its column output value is "1" in the order each corresponding column of pixels is acquired in the video images.

2. The method of claim 1, wherein said flicker-related parameters are selected from the group consisting of percent flicker, order of flicker frequency, and order of flicker index.

3. A method of determining flicker-related parameters of a light emitting source, comprising the steps of:
    (a) acquiring one or more photo images of a light emitting source with an image capturing device that comprises rolling shutter;
    (b) generating, with a processor, from said photo images a flicker frame comprising one or more flicker dark lines, wherein each flicker dark lines has an output column value of 1; and
    (c) generating, with a processor, one or more flicker-related parameters based on said flicker frame, thereby determining the flicker-related parameters of said light emitting source;
    wherein said flicker frame is produced from said photo images with the steps comprising:
    (a) obtaining a brightness value for each pixel in said photo images;
    (b) quantizing said brightness value of each pixel in said photo images;
    (c) assigning a dark level value of "1" to the pixels on each row of the photo images that are bounded by a first pixel and a second pixel, wherein the quantized value of said first pixel is smaller than its preceding pixel in the same row and the quantized value of said second pixel is smaller than its succeeding pixel in the same row, and further wherein the quantized value of said first and second pixels are greater than the minimum of quantized value for all pixels in said photo images;
    (d) assigning a white level value of "1" to the pixels on each row of the photo images that are bounded by a first pixel and a second pixel, wherein the quantized value of said first pixel is larger than its preceding pixel in the same row and the quantized value of said second pixel is larger than its succeeding pixel in the same row, and further wherein the quantized value of said first and second pixels are less than the maximum of quantized value for all pixels in said photo images;
    (e) assigning a column output value of "1" to each column of pixels in said photo images wherein each of said column has more pixels assigned with dark level value "1" than pixels assigned with white level value "1";
    (f) assigning a column output value of "0" to each column of pixels in said photo images wherein each of said column has less or same number of pixels assigned with dark level value "1" compared to pixels assigned with white level value "1"; and
    (g) assembling a flicker frame by drawing each of said column of pixels where its column output value is "1" in the order each corresponding column of pixels is acquired in the photo images.

4. The method of claim 3, wherein said brightness value is obtained by the formula:

$$\text{Brightness, } B_{x,y} = 0.299r + 0.587g + 0.114b$$

wherein r, g and b are the red, green and blue value of the pixel respectively.

5. The method of claim 3, wherein said quantized value $Q(B_{x,y})$ is obtained by the formula:

$$Q(B_{x,y}) = \frac{B_{x,y}}{(255/q)}$$

wherein q is a quantization parameter.

6. The method of claim 3, wherein a value for percent flicker is calculated by the steps comprising:
   (a) determining a minimum brightness value from all pixels that have (i) a dark level value of "1" and (ii) a quantized value greater than the minimum of the quantized value for all pixels in said photo images;
   (b) determining a maximum brightness value from all pixels that have (i) a white level value of "1" and (ii) a quantized value less than the maximum of the quantized value for all pixels in said photo images; and
   (c) calculating the percent flicker as:

$$\frac{\text{maximum brightness} - \text{minimum brightness}}{\text{maximum brightness} + \text{minimum brightness}}.$$

7. The method of claim 2, wherein said order of flicker frequency is calculated by the steps comprising:
   (a) determining a thickness value of each flicker dark line in said flicker frame by summing the number of columns between a starting column and an ending column, wherein all columns between said starting column and said ending column inclusively have column output value of 1; and
   (b) computing an order of flicker frequency by summing up the number of flicker dark lines above a threshold value, wherein said threshold value is T×maximum thickness of all flicker dark lines, and T is a threshold parameter between 0 and 1.

8. The method of claim 2, wherein said order of flicker index is calculated by the steps comprising:
   (a) determining a thickness value of each flicker dark line in said flicker frame by summing the number of columns between a starting column and an ending column, wherein all columns between said starting column and said ending column inclusively have column output value of 1;
   (b) computing an average thickness from all said thickness values that are above a threshold, wherein said threshold is T×maximum thickness of all flicker dark lines, and T is a threshold parameter between 0 and 1; and
   (c) computing an order of flicker index by normalizing said average thickness with the width of the flicker frame.

9. The method of claim 1, wherein said image capturing device is a mobile device selected from the group consisting of a smart phone, a laptop computer, a tablet computer, and a digital camera.

10. The method of claim 1, wherein said light emitting source is an incandescent light bulb, a compact fluorescent lamp, or a Light Emitting Diode lamps (LEDs).

11. The method of claim 1, further comprising the step of storing said flicker-related parameters with the corresponding image or video in a database.

12. The method of claim 11, further comprising the step of comparing and ranking said flicker-related parameters.

13. A device for determining flicker-related parameters of a light emitting source, comprising:
   (a) an image capturing device that comprises rolling shutter for acquiring one or more video images of said light emitting source;
   (b) one or more processors for generating from said video images (i) a flicker frame comprising one or more flicker dark lines, and (ii) one or more flicker-related parameters from said flicker frame; and
   (c) a memory for storing said video images and said flicker-related parameters;
   wherein said flicker frame is produced from said video images by the steps comprising:
   (a) determining the sum of the differences in pixel values between corresponding pixels in successive frames of the video images, wherein any two successive frames, a first frame and a second frame, that have the smallest difference are the frames that have the least motion noise;
   (b) subtracting the pixel value of each pixel on said first frame from the pixel value of the corresponding pixel on said second frame to obtain changes in pixel values over time;
   (c) assigning a column output value of "1" to each column of pixels in said video image wherein in each of said column, the number of pixels having decreased pixel value over time is more than the sum of the number of pixels having increased pixel value over time;
   (d) assigning a column output value of "0" to each columns of pixels in said video image wherein in each of said column, the number of pixels having decreased pixel value over time is not more than the sum of the number of pixels having increased pixel value over time and the number of pixels having no change in pixel value over time; and
   (e) assembling a flicker frame by drawing each of said column of pixels where its column output value is "1" in the order each corresponding column of pixels is acquired in the video images.

14. The device of claim 13, further comprises one or more processors for refining said flicker frame by processing a video.

15. The device of claim 13, wherein said flicker-related parameter is selected from the group consisting of percent flicker, order of flicker frequency, and order of flicker index.

16. The device of claim 13, wherein said image capturing device is a smart phone, laptop computer, tablet computer, or a digital camera.

17. A non-transitory computer-readable medium with instructions stored thereon, that when executed by a processor, perform the steps comprising:
   (a) obtaining a brightness value for each pixel in a captured image;
   (b) obtaining a quantized value for each of said brightness value;
   (c) assigning a dark level value of "1" to pixels on each row of the captured image that are bounded by a first pixel and a second pixel, wherein the quantized value of said first pixel is smaller than its preceding pixel in the same row and the quantized value of said second pixel is smaller than its succeeding pixel in the same row and further wherein the quantized value of said first and second pixels are greater than the minimum of the quantized value for all pixels in said captured image;
   (d) assigning a white level value of "1" to pixels on each row of the captured image that are bounded by a first pixel and a second pixel, wherein the quantized value of said first pixel is larger than its preceding pixel in the same row and the quantized value of said second pixel is larger than its succeeding pixel in the same row and further wherein the quantized value of said first and second pixels are less than the maximum of the quantized value for all pixels in said captured image;
(e) assigning a column output value of "1" to each column of pixels in said captured image wherein each of said column has more pixels assigned with dark level value "1" than pixels assigned with white level value "1";
(f) assigning a column output value of "0" to each column of pixels where each such column has less or same number of pixels assigned with dark level value "1" compared to pixels assigned with white level value "1"; and
(g) assembling a flicker frame by drawing each column of pixels where its column output value is "1" in the order each corresponding column of pixels is acquired in the captured image.

18. A device for determining flicker-related parameters of a light emitting source, comprising:
(a) an image capturing device that comprises rolling shutter for acquiring one or more photo images of said light emitting source;
(b) one or more processors for generating said photo images (i) a flicker frame comprising one or more flicker dark lines, and (ii) one or more flicker-related parameters from said flicker frame; and
(c) a memory for storing said photo images and said flicker-related parameters;
wherein said flicker frame is produced from said photo images with the steps comprising:
(a) obtaining a brightness value for each pixel in said photo images;
(b) quantizing said brightness value of each pixel in said photo images;
(c) assigning a dark level value of "1" to the pixels on each row of the photo images that are bounded by a first pixel and a second pixel, wherein the quantized value of said first pixel is smaller than its preceding pixel in the same row and the quantized value of said second pixel is smaller than its succeeding pixel in the same row, and further wherein the quantized value of said first and second pixels are greater than the minimum of quantized value for all pixels in said photo images;
(d) assigning a white level value of "1" to the pixels on each row of the image that are bounded by a first pixel and a second pixel, wherein the quantized value of said first pixel is larger than its preceding pixel in the same row and the quantized value of said second pixel is larger than its succeeding pixel in the same row, and further wherein the quantized value of said first and second pixels are less than the maximum of quantized value for all pixels in said photo images;
(e) assigning a column output value of "1" to each column of pixels in said photo image wherein each of said column has more pixels assigned with dark level value "1" than pixels assigned with white level value "1";
(f) assigning a column output value of "0" to each column of pixels in said photo image wherein each of said column has less or same number of pixels assigned with dark level value "1" compared to pixels assigned with white level value "1"; and
(e) assembling a flicker frame by drawing each of said column of pixels where its column output value is "1" in the order each corresponding column of pixels is acquired in the photo images.

19. The device of claim 18, wherein said brightness value is obtained by the formula:

Brightness, $B_{x,y}=0.299r+0.587g+0.114b$ wherein r, g and b are the red, green and blue value of the pixel respectively.

20. The device of claim 18, wherein said quantized value $Q(B_{x,y})$ is obtained by the formula:

$$Q(B_{x,y}) = \frac{B_{x,y}}{(255/q)}$$

wherein q is a quantization parameter.

* * * * *